United States Patent [19]
Fry

[11] 3,896,259
[45] July 22, 1975

[54] WIRING HARNESS WITH MOUNTING DEVICE AND METHOD OF MAKING SAME

[75] Inventor: William Lawrence Fry, Haughton, England

[73] Assignee: Rist's Wires & Cables Limited, Birmingham, England

[22] Filed: Jan. 29, 1974

[21] Appl. No.: 437,698

[30] Foreign Application Priority Data
Feb. 13, 1973 United Kingdom.................. 7112/73

[52] U.S. Cl.................. 174/72 A; 156/47; 156/178; 156/300; 156/306; 174/117 F
[51] Int. Cl............................................. H02g 3/02
[58] Field of Search.. 174/70 R, 70 C, 72 A, 72 TR, 174/117 R, 117 F, 117 FF, 117 A; 29/624; 156/47, 178, 300, 301, 306

[56] References Cited
UNITED STATES PATENTS

| | | | |
|---|---|---|---|
| 1,713,302 | 5/1929 | Schemmel.......................... | 174/70 C |
| 1,841,257 | 1/1932 | Schemmel.......................... | 174/70 C |
| 2,931,851 | 4/1960 | Sims.................................. | 174/72 A |
| 3,210,032 | 10/1965 | Van Slyke........................ | 174/72 A X |
| 3,733,428 | 5/1973 | Fry.................................... | 174/72 A |
| 3,819,848 | 6/1974 | Fry.................................... | 174/72 A |

FOREIGN PATENTS OR APPLICATIONS

| | | | |
|---|---|---|---|
| 2,036,798 | 12/1970 | France............................. | 174/117 F |
| 555,745 | 9/1943 | United Kingdom................ | 174/72 A |
| 1,086,823 | 10/1967 | United Kingdom............. | 174/117 F |

Primary Examiner—Laramie E. Askin
Attorney, Agent, or Firm—Holman & Stern

[57] ABSTRACT

A wiring harness, particularly, but not exclusively, for use in a vehicle electrical system including a thermoplastic backing strip. A number of conductive leads each of which comprises a conductive core in a thermoplastic sheath are secured to the backing strip by having their sheath fused thereto. Incorporated in the harness is a mounting device whereby the harness can be mounted on a support panel or the like in use, the mounting device including a member which extends between the lead and the backing strip, and which is held against movement relative to the lead and the backing strip to hold the device in position.

3 Claims, 6 Drawing Figures

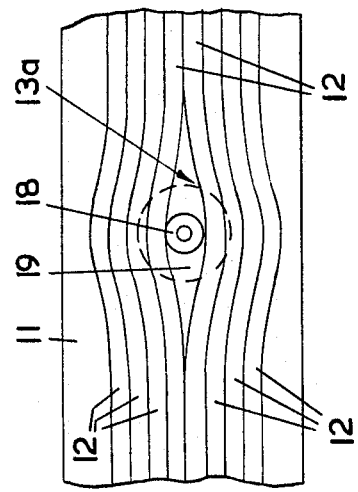
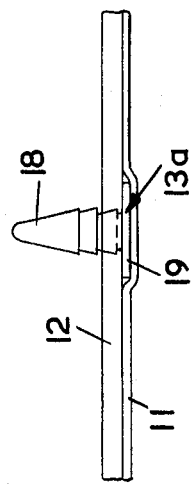
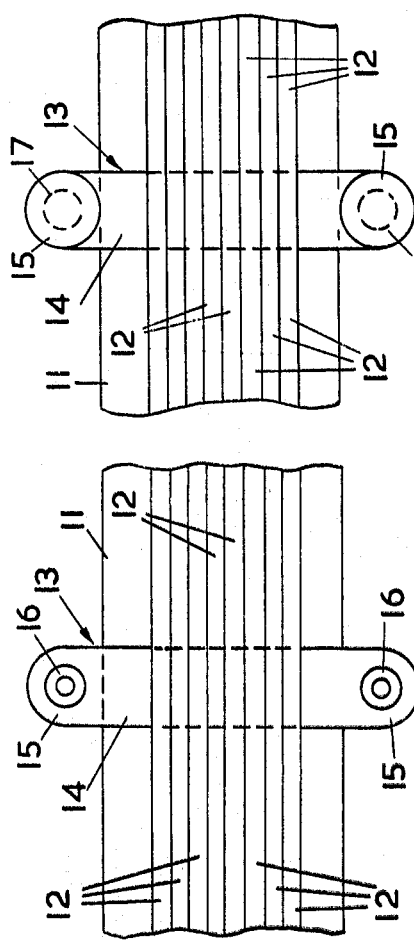
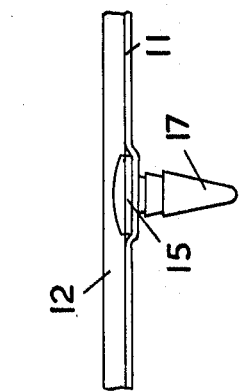
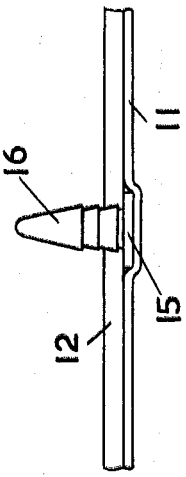

WIRING HARNESS WITH MOUNTING DEVICE AND METHOD OF MAKING SAME

This invention relates to a wiring harness particularly, but not exclusively, for use in a vehicle electrical system.

A harness according to the invention includes, a thermoplastic backing strip, at least one conductive lead comprising a conductive core within a thermoplastic sheath, said sheath being fused to the backing strip to secure the lead to the backing strip, and a mounting device whereby the harness can be mounted on a support panel or the like in use, the mounting device including a member extending between the lead and the backing strip and held against movement relative thereto.

Conveniently said member is held against movement relative to the lead and the backing strip by being trapped against the backing strip by the lead, the sheath of the lead being fused to the backing strip on both sides of the member.

Alternatively, said member is formed for thermoplastic material and is held against movement relative to the lead and backing strip by being fused to the backing strip.

The invention further resides in a method of manufacturing a wiring harness including the steps of positioning at least one lead, having a conductive core in a thermoplastic sheath, on a platform, engaging with the lead a member of a mounting device so that the member overlies part of the lead, and engaging with the lead, along its length, a thermoplastic backing strip while heating the mutually presented surfaces of the lead and the backing strip so that the sheath of the lead and the backing strip fuse together on both sides of the member.

Conveniently, said member is formed from thermoplastic material and during the engagement of the backing strip with the lead, the mutually presented surfaces of the member and the backing strip are heated so that the backing strip and said member fuse together.

One example of the invention is illustrated in the accompanying drawings wherein:

FIG. 1 is a plan view of part of a wiring harness,

FIG. 2 is a side elevational view of the harness shown in FIG. 1,

FIGS. 3 and 4 are views similar to FIGS. 1 and 2 of a first modification, and

FIGs. 5 and 6 are views similar to FIGS. 1 and 2 of a second modification.

Referring first to FIGS. 1 and 2 of the accompanying drawings, the wiring harness includes an elongate backing strip 11 of thermoplastic material, conveniently polyvinylchloride. The harness further includes a plurality of electrical leads 12 each of which consists of a conductive core within an insulating sheath of thermoplastic material, again conveniently polyvinylchloride. The leads 12 are secured in position relative to one another and to the backing strip 11 by having their sheaths fused to the backing strip 11 conveniently along substantially the whole of their length.

The harness further includes one or more mounting devices 13 whereby the harness can be secured to a panel, or similar support structure in use. The mounting device 13 includes a planar member 14 which extends transverse to the length of the harness, and projects at its ends beyond the lateral edges of the backing strip 11 to define lugs 15 each of which includes an integral barbed stud 16. The planar member 14 of the, or each device 13 extends transverse to the harness and lies between the backing strip 11 and the leads 12. The device 13 is held against movement relative to the leads 12 and backing strip 11 by being trapped against the backing strip 11 by the leads 12, the sheaths of the leads 12 being fused to the backing strip 11 on both sides of the member 14. Alternatively, where the planar member 14 is formed from thermoplastic material, then the device 13 can be held in position relative to the harness by fusing the planar member 14 to the backing strip 11.

In use, the harness will be secured to a support structure by engaging the barbed studs 16 of the device 13 of the harness in corresponding apertures in the support structure. Where more than one device 13 is provided on the harness, then the devices will conveniently be spaced apart along the length of the harness, their exact positions in the harness being determined by the nature of the support structure to which the harness is to be mounted. It will be appreciated that where the planar member 14 is formed from materials which are not capable of being fused to the backing strip 11, then the surface of the member 14 which is presented to the backing strip 11 can be provided with protuberances, or other surface characteristics which key the planar member 14 to the backing strip 11. Similarly, where the planar member 14 is formed in a material which is capable of being fused to the backing strip 11, it is not essential that fusion takes place, and the device 13 in this instance could, if desired, be retained in position by trapping the member 14 between the leads and the backing strip 11.

In the modification shown in FIGS. 3 and 4 components common to the harness shown in FIGS. 1 and 2 are indicated by the same reference numerals used in FIGS. 1 and 2. The harness shown in FIGS. 3 and 4 differs from the harness shown in FIGS. 1 and 2 only in that the device 13 does not have integral barbed studs 16, but has, instead, detachable barbed studs 17 which in use extend through corresponding apertures in the lugs 15 of the member 14. In all other respects, the arrangement shown in FIGS. 3 and 4 is identical with the arrangement shown in FIGS. 1 and 2.

Referring now to FIGS. 5 and 6, the basic harness construction including the backing strip 11 and the leads 12 is substantially identical to that described above with reference to FIGS. 1 and 2, and 3 and 4, but includes a mounting device 13a in the form of a barbed stud 18 having a generally planar head 19. The diameter of the head 19 in relation to the shank of the stud 18 is such that with the shank 18 projecting at right angles to the harness, and extending between a pair of adjacent leads of the harness, then said pair of adjacent leads will overlie the head 19, and so the head 19 will be positioned between said pair of adjacent leads and the backing strip 11. The device 13a, as with the device 13 of the aforementioned harnesses, can be secured in position relative to the harness either by the head 19 being trapped between the leads and the backing strip 11, or where the head 19 of the device 13a is formed from thermoplastic material, if desired, by fusing the head 19 to the backing strip 11.

The three alternative harnesses described above are manufactured by the following method.

The leads 12 which have been previously cut to the correct lengths for the harness, and which conveniently have already been provided with terminals at their ends, are laid in the desired pattern on a platform. The mounting device is then engaged with the leads either by laying the planar member 14, in the case of the device 13, across the leads, or in the case of the device 13a by inserting the shank 18 between a pair of adjacent leads so that the head 19 overlies the pair of adjacent leads. The thermoplastic backing strip 11 is then dispensed from a spool onto the leads, along the length of the platform, and as the backing strip 11 is dispensed onto the leads, the mutually presented surfaces of the leads and the backing strip are heated so that as the backing strip engages the sheaths of the leads, the sheaths of the leads and the backing strip fuse together. It will be appreciated, that where the planar member 14, or head 19 of the mounting device is not capable of being fused to the backing strip 11, then the device will be held in position by virtue of the fusing of the backing strip to the sheaths of the leads on both sides of the device. However, where the member 14, or head 19 is capable of fusing to the backing strip 11, then the fusion will take place as the backing strip engages the member 14 or head 19.

Apparatus for producing a wiring harness wherein the backing strip is fused to the sheaths of the leads of harness is described in co-pending U.S. Pat. application No. 387,636 filed Aug. 13, 1973.

I claim:

1. A wiring harness including a thermoplastic backing strip, at least one conductive lead comprising a conductive core within a thermoplastic sheath, said sheath being fused to the backing strip to secure the lead to the backing strip, and, a mounting device whereby the harness can be mounted on a support panel or the like in use, the mounting device including a member formed from thermoplastic material extending between the lead and the backing strip, the member being held against movement relative to the backing strip and the lead by being fused to the backing strip, and, said mounting device further including an element extending outwardly from the backing strip for attachment to said support panel or the like.

2. A wiring harness including a thermoplastic backing strip, at least one conductive lead comprising a conductive core within a thermoplastic sheath, said sheath being fused to the backing strip to secure the lead to the backing strip, and, a mounting device whereby the harness can be mounted on a support panel or the like in use, the mounting device including a member formed from thermoplastic material held against movement relative to the backing strip and the lead by being fused to the backing strip, and, the mounting device further including an element extending outwardly from the backing strip for attachment to the support panel or the like.

3. A method of manufacturing a wiring harness including the steps of positioning at least one lead having a conductive core in a thermoplastic sheath, on a platform, engaging with the lead a thermoplastic member of a mounting device so that the member overlies part of the lead, and engaging with the lead along its length, and at least that portion of the member overlying the lead, a thermoplastic backing strip while heating the mutually presented surfaces of the lead, the member, and the backing strip so that the sheath of the lead and said member fuse to the backing strip.

* * * * *